United States Patent
Wu (10) Patent No.: US 7,091,846 B2
(45) Date of Patent: Aug. 15, 2006

(54) METHODS AND APPARATUS FOR HANDLING INFORMATION REGARDING AN ALARM FOR A COMMUNICATION NETWORK

(75) Inventor: Deh-Min Richard Wu, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 406 days.

(21) Appl. No.: 10/187,167

(22) Filed: Jun. 28, 2002

(65) Prior Publication Data

US 2003/0174162 A1    Sep. 18, 2003

Related U.S. Application Data

(60) Provisional application No. 60/364,783, filed on Mar. 18, 2002.

(51) Int. Cl.
    *G08B 29/00* (2006.01)
(52) U.S. Cl. .................. 340/506; 340/3.1; 340/286.02
(58) Field of Classification Search .............. 340/506, 340/3.1, 286.02
    See application file for complete search history.

(56) References Cited

U.S. PATENT DOCUMENTS

| | | | | |
|---|---|---|---|---|
| 5,400,246 | A * | 3/1995 | Wilson et al. | 700/17 |
| 5,513,343 | A | 4/1996 | Sakano et al. | |
| 6,046,742 | A * | 4/2000 | Chari | 345/734 |
| 6,356,282 | B1 | 3/2002 | Roytman et al. | |
| 6,429,812 | B1 * | 8/2002 | Hoffberg | 342/357.1 |
| 6,470,075 | B1 | 10/2002 | Prieur | |
| 6,697,970 | B1 * | 2/2004 | Chisholm | 714/48 |
| 6,774,786 | B1 * | 8/2004 | Havekost et al. | 340/517 |

OTHER PUBLICATIONS

Baartse, Mark et al., "Professional ASP XML", ©2000 Wrox Press, First published Jun. 2000, Reprinted Oct. 2000. All rights reserved. (Chapter 13—pp. 288-291.

Hong-Taek, Ju et al., "An efficient and lightweight embedded Web server for Web-based network element management", International Journal of Network Management, Int. J. Network Mgmt. 2000; 10:261-275, ©2000 John Wiley & Sons, Ltd.

Drane, Christopher et al., "Positioning GSM Telephones", IEEE Communications Magazine, Apr. 1998. pp. 46-59 (©1998 IEEE).

Reed, Jeffrey H. et al., "An Overview of the Challenges and Progress in Meeting the E-911 Requirement for Location Service", IEEE Communications Magazine, Apr. 1998. pp. 30-37 (©1998 IEEE).

(Continued)

*Primary Examiner*—Daryl C Pope (57) ABSTRACT

A system, method, apparatus, means, and computer program code that may help reduce and possibly minimizes the burden on a network, components of the network, etc. when one or more alarms are created involving the network or one or more of its components. A state driven architecture guiding communication between a first device or application, such as a network management system (NMS), and a second device or application, such as a serving mobile location center (SMLC), may be used to handle communications or information regarding one or more alarms that may be generated by the second device or application as a result of problems involving the network or one or more of its components.

26 Claims, 6 Drawing Sheets

OTHER PUBLICATIONS

"3GPP TS 32.104 v3.4.0 (Dec. 2000)", 3rd Generation Partnership Project; Technical Specification Group Services and System Aspects; Telecommunication Management; and 3G Performance Management (PM) (Release 1999), 35 pgs.

"3GPP TS 04.71 v8.2.0 (Dec. 2001)", 3rd Generation Partnership Project; Technical Specification GSM EDGE Radio Access Network; Location Services (LCS); Mobile radio interface layer 3; and Location Service LCS) specification (Release 1999). 57pgs.

"ETSI TS 101 513 v8.0.1 (Nov. 2000)", Digital cellular telecommunications system (Phase 2+); Location Services (LCS); Location services management (GSM 12.71 version 8.0.1 Release 1999). 65pgs.

CCITT x.733, Data Communication Networks, "Information Technology—Open Systems Interconnection—Systems Management: Alarm Reporting Function", ©ITU 1992. 23pgs.

* cited by examiner

METHODS AND APPARATUS FOR HANDLING INFORMATION REGARDING AN ALARM FOR A COMMUNICATION NETWORK

CROSS REFERENCE TO RELATED APPLICATION

The present application claims priority from commonly owned provisional U.S. application No. 60/364,783 filed Mar. 18, 2002 and entitled "Radio Commander Alarm Monitoring Serving Mobile Location Center Via State-Based Architecture".

BACKGROUND OF THE INVENTION

The present invention relates to a method and apparatus for processing or otherwise handling an alarm, or information regarding the alarm, for a communication network.

In some networks containing devices, a network management system may be used to monitor the network and devices. In addition, the network management system may be used to allow an operator to receive messages regarding the status of the network, components or links in the network, etc. In some situations, an alarm or other message may be created when a problem exists in the network or with a component or device in the network. For example, a switch in the network may experience a power failure or a communication link between a base transceiver and a mobile device (e.g., a cellular telephone) may suffer quality problems.

An alarm or message indicative of a network problem may include information regarding the problem. As a network may experience a variety of problems simultaneously, sending such information to the network management system each time a problem exists or an alarm is created may impact the performance of the network or the network management system or otherwise create data traffic burdens for the network or the network management system. For example, if enough problems occur in a network at about the same time, the network management system may not be able to handle all of the alarms or other messages sent to it. Thus, some of the alarm or message information may be lost or another device may need to store the alarms or other messages on behalf of the network management system. As a result, the device and the network management system may need to periodically align themselves with regard to the alarms or other information, thereby creating further traffic on the network and increasing the burden of the network management system.

It would be advantageous to provide a method and apparatus that overcame the drawbacks of the prior art. In particular, it would be desirable to provide a system, method, apparatus, means, and computer program code that reduced the burden on a network management system, network, components of the network, etc. when one or more alarms are created.

SUMMARY OF THE INVENTION

Embodiments of the present invention provide a system, method, apparatus, means, and computer program code for handling or processing information regarding an alarm created as a result of problem in a network, with a network element, etc. and/or for reducing and possibly minimizing the burden on a network management system, the network, components of the network, etc. when one or more alarms are created. A state driven architecture used by a first device or application, such as a device or application implementing or operating network management system (NMS), and a second device or application, such as a device or application implementing a serving mobile location center (SMLC), may be used to handle communications or information regarding one or more alarms that may be generated by the second device or application as a result of problems involving the network or one or more of its components. For example, the SMLC may operate in one of multiple states. The operating states of the SMLC may correspond to potential alarm states or severity levels. Problems in the network or one of its components may result in the SMLC generating an alarm and changing its operating state as a result. Alternatively, a clearance of an earlier generated alarm may cause the SMLC to change it is operating state. The SMLC may provide a notification to the NMS when it changes its operating state. The NMS may then request additional information underlying the change of state of the SMLC, which may provide the NMS with additional information regarding the alarm or the clearance of the alarm.

Additional objects, advantages, and novel features of the invention shall be set forth in part in the description that follows, and in part will become apparent to those skilled in the art upon examination of the following or may be learned by the practice of the invention.

According to some embodiments of the present invention, a method for handling information regarding an alarm may include determining a state change event; providing a first notification regarding the first state change event to a device or application (which may be or implement a network management system); receiving a request from the device or application for an updated active alarm list; and providing the updated active alarm list to the device or application after receiving the request. In another embodiment, a method for handling information regarding an alarm may include receiving a first notification regarding a first state change event from a device or application (which may be or implement an SMLC); providing a request to the device or application for an updated active alarm list; and receiving the updated active alarm list from the device or application.

According to some embodiments of the present invention, a system for handling information regarding an alarm may include a memory; a communication port; and a processor connected to the memory and the communication port, the processor being operative to determine a state change event; provide a first notification regarding the first state change event to a device or application (which may be or implement a network management system); receive a request from the device or application for an updated active alarm list; and provide the updated active alarm list to the device or application after receiving the request. In other embodiments, a system for handling information regarding an alarm may include a memory; a communication port; and a processor connected to the memory and the communication port, the processor being operative to receive a first notification regarding a first state change event from a device or application (which may be or implement an SMLC); provide a request to the device or application for an updated active alarm list; and receive the updated active alarm list from the device or application.

According to some embodiments of the present invention, a computer program product in a computer readable medium for handling information regarding an alarm may include first instructions for identifying a state change event; second instructions for sending a first notification regarding the first state change event to a device or application (which may be or implement a network management system); third instructions for obtaining a request from the device or-application for an updated active alarm list; and fourth instructions for sending the updated active alarm list to the device or application after receiving the request. In some further embodiments, a computer program product in a computer readable medium for handling information regarding an alarm may include first instructions for obtaining a first notification regarding a first state change event from a device or application (which may be or implement an SMLC); second instructions for sending a request to the device or application for an updated active alarm list; and third instructions for obtaining the updated active alarm list from the device or application.

According to some embodiments of the present invention, an apparatus for handling information regarding an alarm may include means for identifying a state change event; means for sending a first notification regarding the first state change event to a device or application (which may be or implement a network management system); means for obtaining a request from the device or application for an updated active alarm list; and means for sending the updated active alarm list to the device or application after receiving the request. In some further embodiments, an apparatus for handling information regarding an alarm may include means for obtaining a first notification regarding a first state change event from an device or application (which may be or implement an SMLC); means for sending a request to the device or application for an updated active alarm list; and means for obtaining the updated active alarm list from the device or application.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DETAILED DESCRIPTION OF SPECIFIC EMBODIMENTS

Applicant has recognized that there is a need for systems, means and methods that help reduce and possibly minimizes the burden on a network management system, network, components of the network, etc. when one or more alarms are created. A state driven architecture between a first device or application and a second device or application may be used to handle communications or information regarding one or more alarms that may be generated by the second device or application as a result of problems involving the network or one or more of its components. A network management system (NMS) may be implemented by or operating on the first device or application while a serving mobile location center (SMLC) may be implemented by or operating on the second device or application. The second device or application may operate in one of a defined set of operating states, each of which may correspond to an alarm severity level. Problems in the network or one of its components may result in the second device or application (e.g., the SMLC) generating or otherwise initiating an alarm and changing its operating state. Alternatively, a clearance of an earlier generated alarm may cause the second device or application to change its operating state. The second device or application may provide a notification (e.g., XML transmission) to the first device or application (e.g., the NMS) that it has changed its operating state as the result of the alarm or the clearance of an alarm. The first device or application may then request additional information from the second device or application underlying the change of state of the second device or application.

With this approach in a system using an NMS and an SMLC, the resulting alarm reporting architecture is state driven, such that the monitoring NMS only needs to gather information from the SMLC if an abnormal situation has been observed. Thus, the NMS can collect information on demand while reducing unnecessary traffic between the SMLC and the NMS. The NMS can reflect the operational state of the SMLC in real time and may collect alarm data from the SMLC when alarm monitoring is activated by the receipt of a state change event report from the SMLC. When an operator is viewing an active alarm list, the NMS may periodically request the active alarm list from the SMLC so that the operator has current information. These and other features will be discussed in further detail below, by describing a system, individual devices, and processes according to embodiments of the invention.

System Description

Figure 1:
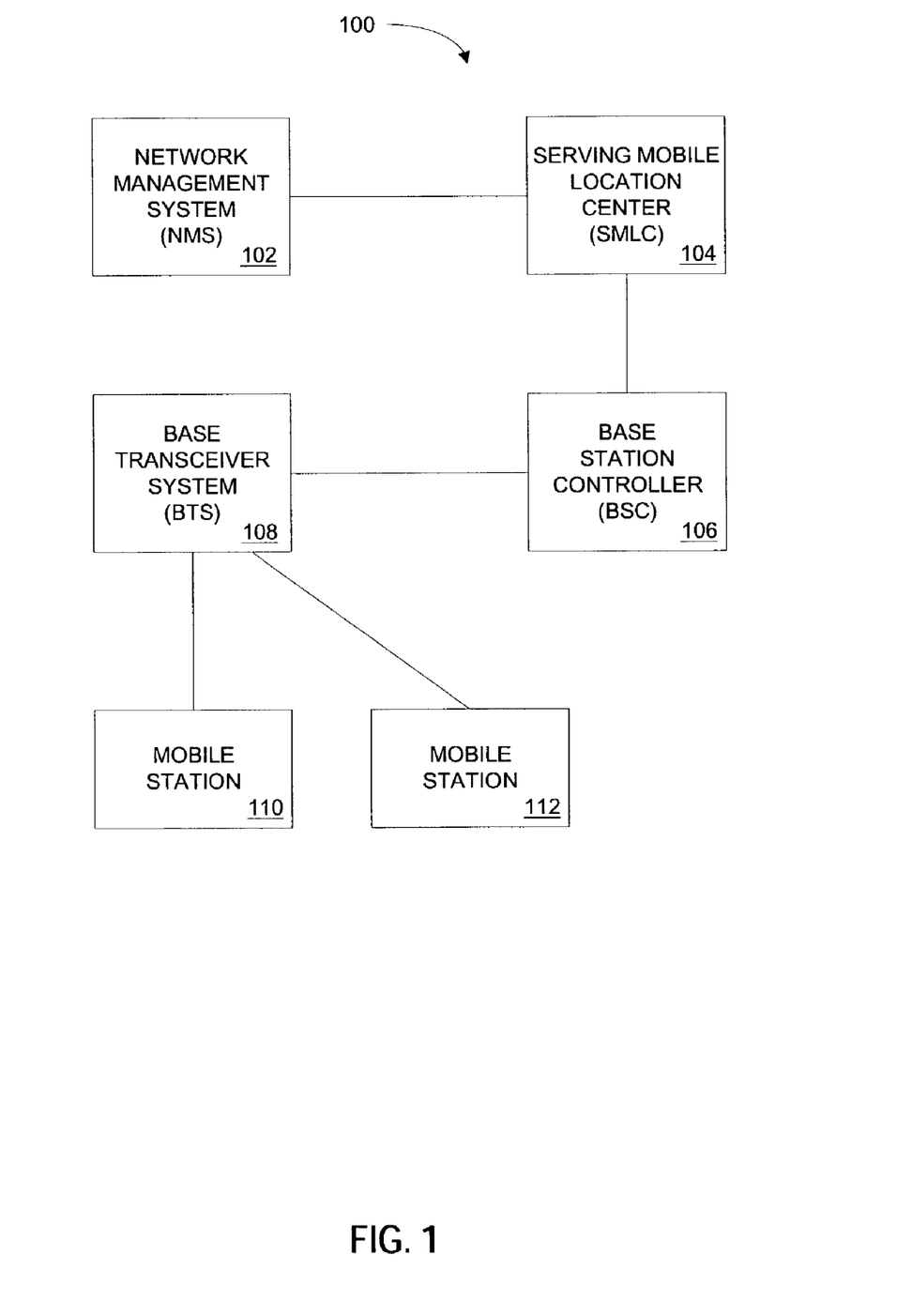
FIG. 1 is a block diagram of system components for an embodiment of an apparatus in accordance with the present invention.

Now referring to FIG. 1, a system 100 is illustrated that may use the event driven alarm techniques described herein. The system 100 includes a network management system (NMS) 102 connected to, or in communication with, a serving mobile location center (SMLC) 104. In some embodiments, either or both of the NMS 102 and the SMLC 104 may be implemented in hardware, software, or a combination of hardware and software.

While the methods and apparatus of the present invention primarily relate to the NMS 102 and the SMLC 104, the NMS 102 and/or the SMLC 104 may be in communication with other devices and the apparatus 100 may include other devices. For example, the SMLC 104 may be connected to, or in communication with, a base station controller (BSC) 106 that is, in turn, connected to, or in communication with, a base transceiver system (BTS) 108. The base transceiver system 108 may be connected to, or in communication with, one or more mobile stations or user devices 110, 112. In some embodiments, the SMLC 104 may be connected to other base station controllers as well as other devices (e.g. mobile switching centers, local maintenance terminals). In addition, in some embodiments, the NMS 102 may be connected to or in communication with the base station controller 106 and or other devices in the apparatus 100. The base station controller 106 also may be connected to or in communication with other base transceiver systems and/or or devices (e.g., transcoding and rate adaption units).

In some embodiments, the NMS 102, the SMLC 104 and some or all of the remaining components of the system 100 may be part of a GSM (Global System for Mobile Communication) compliant network or system. The components 102, 104, 106, 108, 110, 112 of the system 100 may communicate with each other in a variety of ways or via a variety of communication channels. For example, in some embodiments some or all the components 102, 104, 106, 108, 110, 112 of the system 100 may be directly connected to each other and/or may communicate across a communications network. The communications network might be or include the Internet, the World Wide Web, or some other public or private computer, cable, telephone, radio, mobile, client/server, peer-to-peer, or communications network or intranet. The communications network may include public and/or private wide area networks, local area networks, wireless networks, data communication networks or connections, intranets, routers, satellite links, microwave links, cellular or telephone networks, radio links or networks, fiber optic transmission lines, ISDN lines, T1 lines, DSL, etc. Moreover, in some embodiments communications between some or all of the components 102, 104, 106, 108, 110, 112 may be facilitated by wired or wireless technology or communication channels.

In some embodiments, the apparatus 100 may be used to support or provide mobile communications between different mobile stations or user devices. The mobile stations or user devices 110, 112 preferably allow entities to interact with the apparatus 100, devices connected to the apparatus 100, etc. Possible user devices include a personal computer, portable computer, mobile or fixed user station, workstation, network terminal or server, cellular telephone, kiosk, dumb terminal, personal digital assistant, etc. In some embodiments, information regarding one or more users and/or one or more user devices may be stored in, or accessed from, a user information database and/or a user device information database.

In embodiments where the apparatus 100 is used to support or provide mobile communications between different mobile stations or user devices, the SMLC 104 may perform and/or provide call processing, configuration monitoring, and functional management tasks and services for the base transceiver system 108. In addition, in some cases it may be desirable to determine the location or position of one of the mobile stations 110, 112. For example, the SMLC 104 maybe used to calculate timing advance value of the mobile station 110 with a positioning accuracy of five hundred meters. The SMLC 104 may receive the positioning request from the base station controller 106 and calculate the location the mobile station or otherwise control the overall location procedure for a mobile station by initiating location related measurements upon receiving the request. Other roles for the SMLC 104 or services provided by the SMLC 104 may include sending the position result calculated by SMLC 104 to a location service client or other requestor of the position of a mobile station. The SMLC 104 may include functionality to support a location service (LCS) and may manage the coordination and scheduling of resources needed to perform positioning of a mobile station.

The NMS 102 may collect data from the SMLC 104 and/or other components of the apparatus 100 and provide or display information and management functions to an operator. For example, the NMS 102 may display information regarding the operational state of the SMLC 104, active alarm lists, etc. Other roles for the NMS 102 or services provided by the NMS 102 may include the configuration monitoring and administration of the SMLC 104.

The base station controller 106 may handle and route information and communications between the base transceiver system 108 and the SMLC 104 directly or via one or more signaling transition points. The base system controller 106 also may handle and route information and communication between the base transceiver system 108 and the NMS 102. Other roles for the base station controller 106 or services provided by the base station controller 106 may include information model mediation and maintaining a database of configuration information for controlling and/or monitoring the base transceiver system 108. The base transceiver system 108 may handle and route information and communications between mobile stations and/or the base station controller 106. Other roles for the base transceiver system 108 or services provided by the base transceiver system 108 may include collecting location measurement data and transmitting/receiving radio data.

Many different types of implementations or hardware/software configurations can be used in the system 100, the NMS 102, and the SMLC 104 and with the methods disclosed herein and the methods disclosed herein are not limited to any specific hardware configuration for the system 100 or any of its components.

Figure 2:
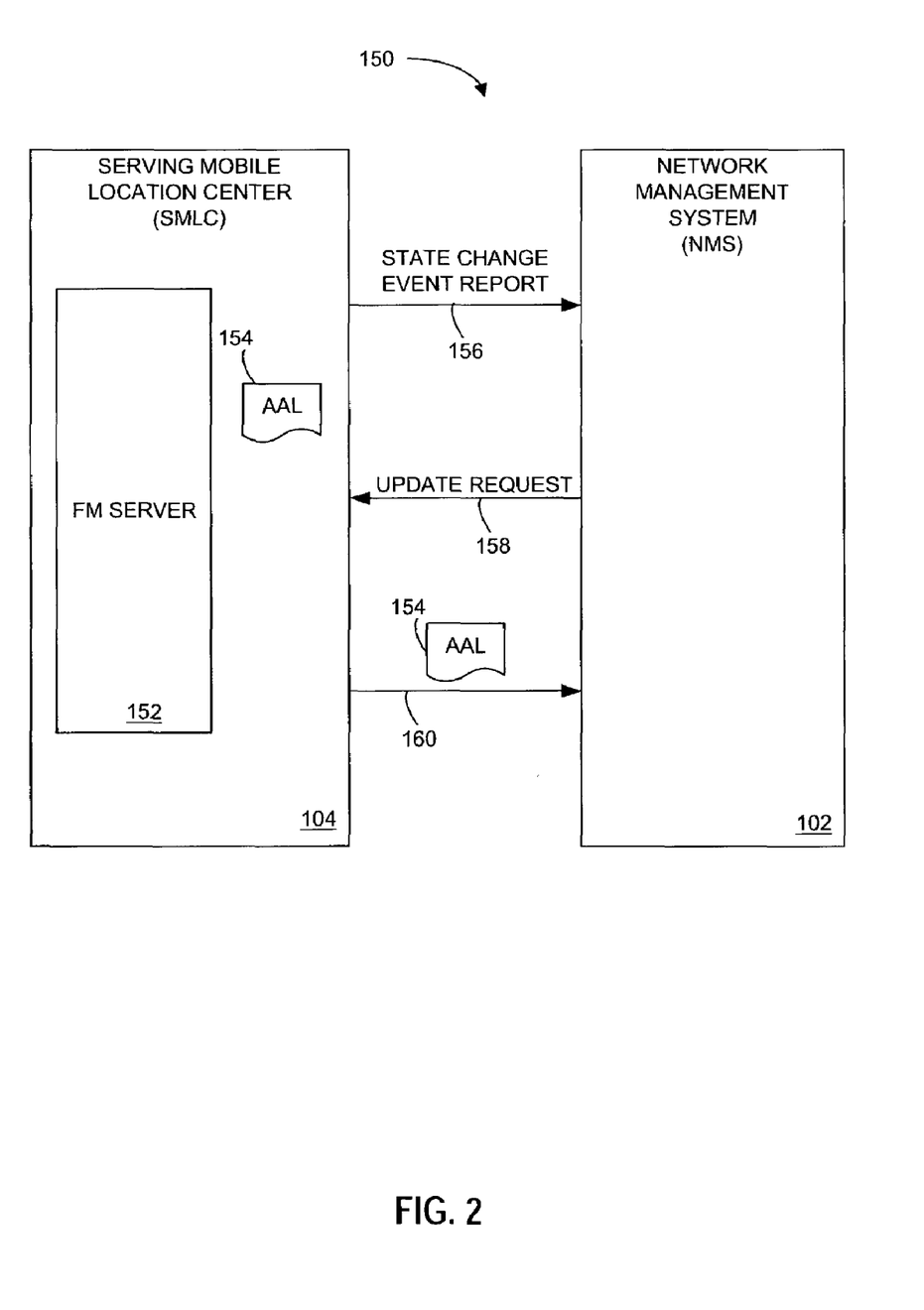
FIG. 2 is a block diagram of the network management system and the serving mobile location center of FIG. 1.

Now referring to FIG. 2, a more detailed illustration 150 is provided of the NMS 102 and the SMLC 104 and communications that may occur between in accordance with the present invention. In accordance with the present invention, the SMLC 104 and the NMS 102 may be used to process alarms pertaining to or arising from a network associated with the SMLC 104 and the NMS 102. In a network, an error message may be created when a problem arises in the network. The SMLC 104 may receive an error message or other indication regarding a problem associated with a network, a network element, etc. The error message may result in an alarm being generated or otherwise initiated by the SMLC 104. The SMLC 104 may include a fault management server or component 152 that is used to receive and/or handle error messages received by the SMLC 104 regarding a problem (e.g., a problem with a network element). In addition, the fault management server 152 may be used to display and manage an alarm which might include, for example, logging, clearing, and/or forwarding an alarm; generating, maintaining, updating and/or manipulating an active alarm list, etc.

An alarm may be cleared by the SMLC 104 when the problem that gave rise to the alarm is resolved. For example, the defective component or network element that gave rise to the alarm is replaced or the error is removed via a reset function.

In general, the SMLC 104 may operate in one of a plurality of states. In some embodiments, the operating state of the SMLC 104 may track the possible states or severity levels of alarms that are generated or initiated by the SMLC 104 in response to error messages received by the SMLC 104. For example, conventional alarm severity levels may be or include five possible levels: "critical", "major", "minor", "intermediate", and "warning". In some embodiments, a "cleared" severity level or one or more additional or different severity levels also may be used. The SMLC 104 may operate in states that correspond to the five convention alarm security levels (or other or different security levels if such security levels are used). One description of potential alarm security levels that may be used can be found in the International Telecommunication Union Recommendation X.733 entitled Data "Communication Networks, Information Technology—Open Systems Interconnection—Systems Management: Alarm Reporting Function" (1992) (herein referred to as the "Recommendation|International Standard").

The critical alarm severity level may be indicative of where it is no longer possible to provide the service requested by (or promised to) the service user. The Critical severity level also may indicate that a service affecting condition has occurred and an immediate corrective action is required. Such a severity can be reported, for example, when a managed object (e.g., network element) becomes totally out of service and its capability must be restored.

The major severity level may indicate that a service affecting condition has developed and an urgent corrective action is required. Such a severity can be reported, for example, when there is a severe degradation in the capability of the managed object (e.g., a network element) and its full capability must be restored.

The minor severity level may indicate the existence of a non-service affecting fault condition and that corrective action should be taken in order to prevent a more serious (for example, service affecting) fault. Such a severity can be reported, for example, when the detected alarm condition is not currently degrading the capacity of the managed object (e.g., a network element).

The intermediate alarm severity level may indicate that a severity level cannot be determined. An intermediate alarm severity level may be indicative of a situation where there is no impact upon the quality of service offered to the user.

The warning severity level may indicate the detection of a potential or impending service affecting fault, before any significant effects have been felt. Thus, action may be taken to further diagnose (if necessary) and correct the problem in order to prevent it from becoming a more serious service affecting fault.

As mentioned previously above, in some embodiments a cleared security level may be used. The cleared severity level may indicate a clearing of one or more previously reported alarms. This alarm clears all alarms for this managed object that have the same alarm type or category (e.g., security alarm, environmental alarm, process alarm, communication alarm, software alarm), probable cause and specific problem(s). In some embodiments, the SMLC 104 may report to the NMS 102 a clearing of a previously reported alarm and may operate in a "cleared" or intermediate (sometimes referred to as normal) operating state (i.e., currently there are no uncleared alarms being processed by the SMLC 104). In some embodiments, the cleared operating state for the SMLC 104 may exist even if the cleared alarm severity level is not used.

In some embodiments, more than one alarm may be active or uncleared simultaneously. For example, the SMLC 104 may form part of, or monitor, a network and may receive an error message that indicates a problem is occurring in the network (or with one of the network's elements or components) that has a major alarm severity level. While the first alarm remains uncleared (e.g., unresolved), the SMLC 104 may receive a second error message that indicates a different problem is also occurring somewhere in the network that has a critical alarm severity level.

The SMLC 104 may operate at an alarm state indicative of the highest severity level for an uncleared alarm generated by the SMLC 104. When the state of the SMLC 104 tracks the state of an alarm severity level, the SMLC 104 may be in critical state when the highest uncleared alarm is at the critical severity level, in the major state when the highest uncleared alarm is at the major severity level, in the minor state when the highest uncleared alarm is at the minor severity level, in the normal or intermediate state when the highest uncleared alarm is at the normal or intermediate severity level, and in the warning state when the highest uncleared alarm is at the warning severity level. In a typical hierarchy, the critical alarm severity level is higher or more serious than the major alarm severity level, the major alarm severity level is higher or more serious than the minor alarm severity level, the minor alarm severity level is higher or more serious than the normal or intermediate severity level, etc.

In some cases, more than one uncleared alarm may happen simultaneously. For example, assume the SMLC 104 has generated three alarms that currently remain uncleared, one with an alarm severity level of critical, one with an alarm severity level of major, and one with an alarm severity level of minor. Since the highest uncleared alarm has a severity level of critical, the SMLC 104 will be in a state designated as critical. If the SMLC 104 clears the critical alarm while the major alarm remains uncleared, the SMLC 104 will change state from the state designated as critical to a state designated as major, regardless of the current cleared or uncleared nature of the minor alarm. If the SMLC 104 later generates another critical alarm while the major alarm remains uncleared, the SMLC 104 will change back to a state of critical. In some embodiments, the SMLC 104 may operate differently or prioritize or process resources, messages, etc. differently in different operating states.

When the SMLC 104 receives an error message that indicates that a problem exists, the SMLC 104 may determine the severity level of the alarm and add the alarm to an active or uncleared alarm list 154. In some embodiments, the active alarm list (AAL) 154 may include information such as the date/time of the alarm, the date/time of an error message received by the SMLC 104 indicative of the problem underlying the alarm, an identifier of a network element (NE) on or at which the problem is occurring, the probable cause, alarm acknowledgement information, etc. In some embodiments, upon receiving an error message regarding a network element, the SMLC 102 may query the network element or other devices to as certain additional information regarding the problem with the network element.

Once the SMLC has generated an alarm in response to the error message, if the severity level of the alarm is lower that the current operating state of the SMLC 104, the SMLC 104 may change its operating state to match that of the alarm. If the severity level of the alarm is higher that the current operating state of the SMLC 104, the SMLC 104 may change its operating state to match that of the alarm. In addition, the SMLC 104 may send a state change event report to the NMS 102, as indicated by arrow 156 in FIG. 2. In some embodiments, the state change event report sent by the SMLC 104 to the NMS 102 may include information such as: the new state of the SMLC 104, time of the state change, SMLC object identifier (e.g., an identifier associated with the SMLC 104), etc.

In some embodiments, once the NMS 102 has received a state change event report from the SMLC 104. The NMS 102 may display an alarm indication and/or store the state change event information in a database. In some embodiments, the NMS 102 may display the current state of the SMLC 104 in a displayed window, text message or icon. In some embodiments, the NMS 102 may cause a message or background to flash, to change color, font or size, or to require an acknowledgement from an operator. Alternatively, the NMS 102 may generate an audible tone or signal indicative of the state change event report, the new state of the SMLC 102, a problem with a network element, etc.

Once the NMS 102 has received a state change event report from the SMLC 104, the NMS 102 may request additional information from the SMLC 104 regarding the alarm or problem that gave rise to the change of state by the SMLC 104. For example, the NMS 102 may request additional information by sending an update request to the SMLC 104, as indicated by arrow 158 in FIG. 2. The NMS 102 may send the update request automatically once it receives the state change event report from the SMLC 104. Alternatively, the NMS 102 may send the update request only when commanded to so by an operator. As another alternative, the NMS 102 may sent the update request immediately if the state of the SMLC 104 moves to a higher level (e.g., major to critical, intermediate to major) but only after lapse of a designated period of time or under the instruction of an operator if the state of the SMLC 104 moves to a lower level (e.g., critical to minor, major to minor). As a further alternative, the NMS 102 may send update requests to the SMLC 104 only when the new state is major or critical, but not minor, intermediate or warning. Different combinations also are possible. In yet another alternative, the NMS 102 may only request updates when more than a designated number of alarms remain uncleared for longer than a designated period of time or when the alarms regard designated network elements.

In some embodiments, information regarding when or under what circumstances an NMS 102 may send an update request may be stored in a database. An operator or the NMS 102 may determine or establish one or more rules or guidelines for when the NMS 102 will send an update request and/or what is being request. In some embodiments, the NMS 102 may send different update requests depending on different rules or circumstances. For example, in some embodiments the NMS 102 may request an update on all alarms previously reported to the NMS 102 and/or all alarms that have occurred since the last update provided by the SMLC 104 to the NMS 102. In other embodiments, the NMS 102 may request an update only to one or more designated alarms (e.g., the last alarm that caused a state change in the SMLC 104, the previously reported alarms having a severity or major or critical).

Once the SMLC 104 receives an update request from the NMS 102, the SMLC 104 may provide an updated active alarm list 154 or other report to the NMS 102, as indicated by arrow 160. In some embodiments, the information provided by the SMLC 104 to the NMS 102 may include one or more of the following: information regarding the status of all currently uncleared alarms, information regarding one or more alarms cleared since the last reporting by the SMLC 104 to the NMS 102, information regarding one or more alarms designated or indicated by the NMS 102 in the update request, etc. In some embodiments, the SMLC 104 may create and later clear an alarm without sending a state change event report and/or an updated active alarm list to the NMS 102 during the interim period. Likewise, in some embodiments the SMLC 104 may change states one or more times before receiving an update request from the NMS 102 or providing an updated active alarm list to the NMS 102.

As previously discussed above, in some embodiments the information provided in an active alarm list by the SMLC 104 may include a network element identifier, a network element type or description, etc. Once the NMS 102 receives the active alarm list 154 or other report from the SMLC 104, the NMS 102 may display or otherwise provide some or all of the information contained within the active alarm list or other report to an operator (e.g., display an alarm clearance in a window, display event information regarding an alarm in a window), store or log some or all of the information, etc.

Process Description

Figure 4:
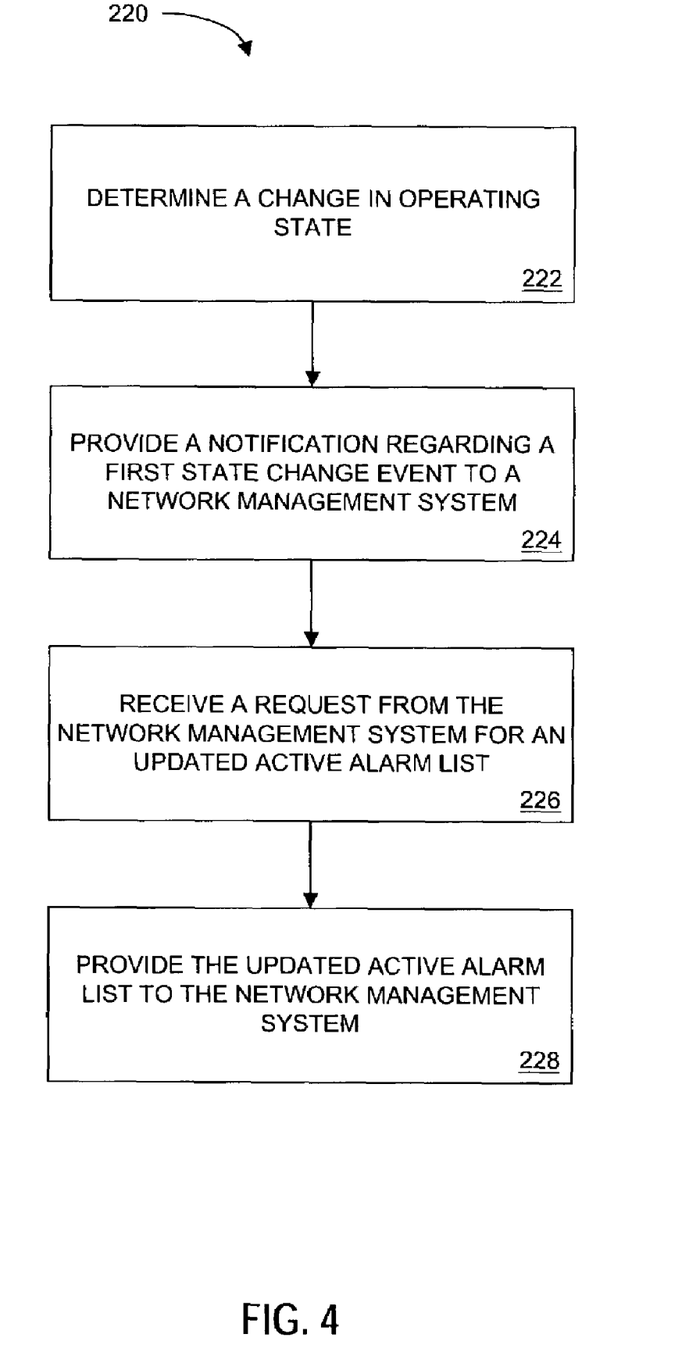
FIG. 4 is a flowchart of a first embodiment of a method in accordance with the present invention and usable with the serving mobile location center and the network management system of FIGS. 1 and 2.

Reference is now made to FIG. 4, where a flow chart 220 is shown which represents the operation of a first embodiment of the present invention. The particular arrangement of elements in the flow chart 220 is not necessarily meant to imply a fixed order to the steps; embodiments of the present invention can be practiced in any order that is practicable. In some embodiments, some or all of the steps of the method 200 may be performed or completed by the SMLC 104 or another device or application, as will be discussed in more detail below. For purposes of the following discussion, the method 220 is assumed to be implemented by the SMLC 104.

Processing begins at a step 222 during which the SMLC 104 determines a change in its operating state. As previously discussed above, the operating states of the SMLC 104 may track or be associated with a respective set of alarm severity levels used by the SMLC 104. Thus, if five different alarm severity levels are possible, the SMLC 104 may have five different operating states, each of which corresponds to a different one of the five alarm severity levels. If a new alarm generated by the SMLC 104 causes the SMLC 104 to change operating state, or if a clearance of an alarm causes the SMLC 104 to change operating state, the SMLC 104 may send the notification regarding the state change to the NMS 102 during the step 224. Thus, the state change event is a result of the alarm (and as a result is associated with the alarm). As previously discussed above, the SMLC 104 may generate an alarm when hardware or software fails to work or network service is not fully supported or available, or as a result of degradation of network service quality provided. The SMLC 104 may clear an alarm when the abnormal observation disappears or as a result of network service quality is fully supported.

During a step 224, a notification is provided to the NMS 102 regarding the change of operating state of the SMLC 104 determined during the step 222. As previously discussed above, the SMLC 104 might not send a notification to the NMS 102 when the SMLC 104 generates a new alarm that does not result in the SMLC 104 changing state or when an alarm is cleared by the SMLC 104 but the SMLC does not change state. As previously mentioned above, the notification may be in an XML compatible format and may include information such as version of XML protocol, sender of the XML file, vendor of the sender and start time to the collected information in the XML file, etc. In some embodiments, the notification may provide only information regarding the state change of the SMLC 104 without providing information regarding the alarm occurrence or clearance that resulted in the state change. Thus, the information may not provide details of the alarm associated with the state change event. An alarm may be associated with a state change event as a result of the alarm being generated or cleared by the SMLC 104 such that the state change event occurs for the SMLC 104.

During a step 236, the SMLC 104 may receive a request from the NMS 102 for an updated active alarm list. As previously mentioned above, the request may be in an XML compatible format and may include information such as NMS object identifier (e.g., an identifier associated with the NMS 102), version of XML protocol used for the request, sender of XML file, vendor of the sender (e.g., the NMS 102), start time of request, etc.

During a step 228, an updated active alarm list is provided to the NMS 102. As previously mentioned above, the active alarm list may be in an XML compatible format and may include information such as protocol version, sender data, network element identifier, event data, etc.

In some embodiments, the method 220 may include one or more of the following: receiving an error message or other indication of a problem with a network element, generating an alarm, clearing an alarm, generating an alarm that causes a state change event for the SMLC 104, clearing an alarm that causes a state change event for the SMLC 104, operating in one or more states, operating in one or more states that track or are associated with a respective plurality of alarm severity levels, providing one or more additional notifications to the NMS 102 regarding state changes, determining an alarm severity, establishing an operating state based on an alarm severity, implementing the network management system 102, etc.

Figure 5:
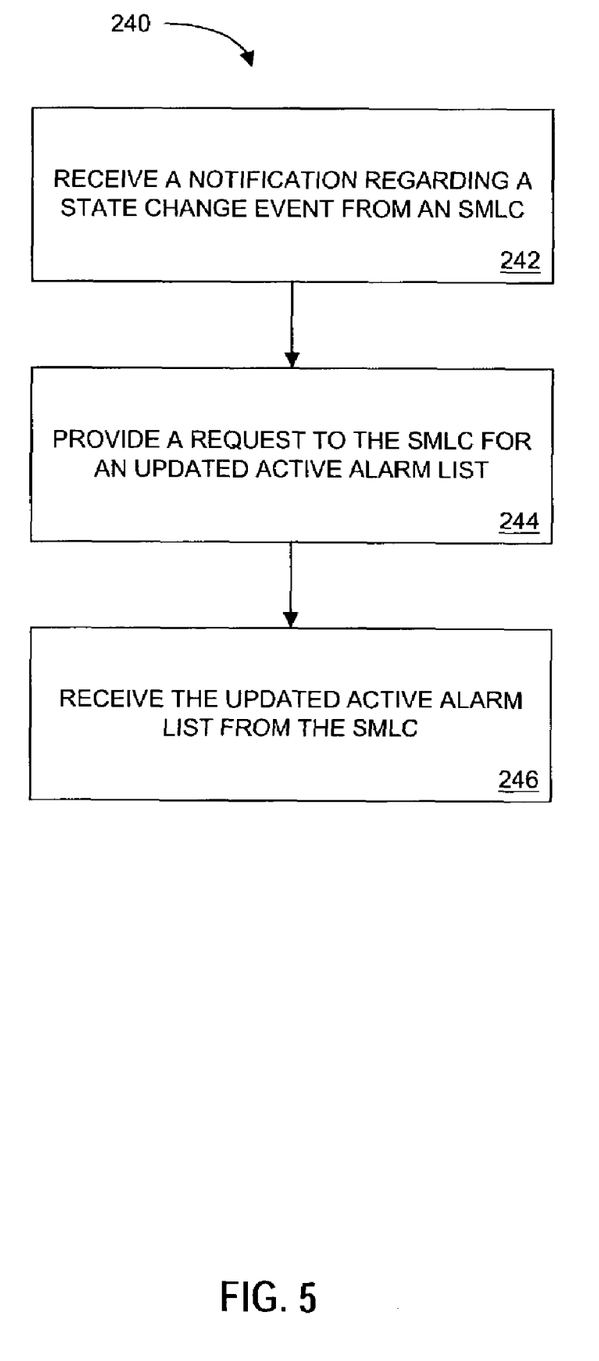
FIG. 5 is a flowchart of a second embodiment of a method in accordance with the present invention and usable with the serving mobile location center and the network management system of FIGS. 1 and 2.

Reference is now made to FIG. 5, where a flow chart 240 is shown which represents the operation of a second embodiment of the present invention. The particular arrangement of elements in the flow chart 240 is not meant to imply a fixed order to the steps; embodiments of the present invention can be practiced in any order that is practicable. In some embodiments, some or all of the steps of the method 240 may be performed or completed by the NMS 102 or another device or application, as will be discussed in more detail below. The method 240 from the perspective of the NMS 102 is complementary to the perspective of SMLC 104 for the method 220. For purposes of the following discussion, the method 240 is assumed to be implemented by the NMS 102.

Processing begins at a step 242 during which a notification regarding a state change event is received from the SMLC 104. During a step 244, the NMS provides a request to the SMLC 104 for an updated active alarm list. During a step 246, the NMS 102 receives the requested updated active alarm list from the SMLC 104.

In some embodiments, the method 220 may include one or more of the following: resolving an alarm, displaying some or all of the state change event notification received during the step 242, storing some or all of the state change event notification received during the step 242, displaying some or all of the updated active alarm list received during the step 246, storing some or all of the updated active alarm list received during the step 246, receiving a command to request the updated active alarm list, determining or establishing one or more rules regarding when to request the updated active alarm list, etc.

XML Protocol

As previously discussed above, in some embodiments, the state change event report sent from the SMLC 104 to the NMS 102, the update request sent from the NMS 102 to the SMLC 104, and/or the updated active alarm list or other report sent from the SMLC 104 to the NMS 102 may be in any form or format or sent via any of a number of communication channels (e.g., HTML, FTP, instant message, email or radio signal transmission). The communications between the NMS 102 and the SMLC 104 may follow or be compliant with one or more of a number of different protocols (e.g., Interface Description Language (IDL), Guideline for Definition of Managed Object (GDMO)).

In some embodiments, file transmissions or other communications from or between the SMLC 104 and the NMS 102 may be XML (Extensible Mark-Up Language) compliant or other platform independent protocol. For example, now referring to FIG. 3, a representative interface schema 180 for a file or other communications between the SMLC 104 and the NMS 102 is illustrated. The interface schema 180 allows an alarm event report to be stored as an observation object and transmitted as a file using the XML protocol. The SMLC 104 may handle adding and removing alarm records from XML files, editing or maintaining alarm files, etc. The XML protocol allows data to be described in a document via structured text that is platform independent and facilitates document data exchange. In addition, the XML protocol supports a data interface that does not include encoding or compatibility problems. Using the XML protocol allows an active alarm list to be described using all object data, which is easy to read, display, transport, and store in a database. The active alarm list provided in an XML compliant document may be updated for each alarm that is generated or cleared by updating the document.

Figure 3:
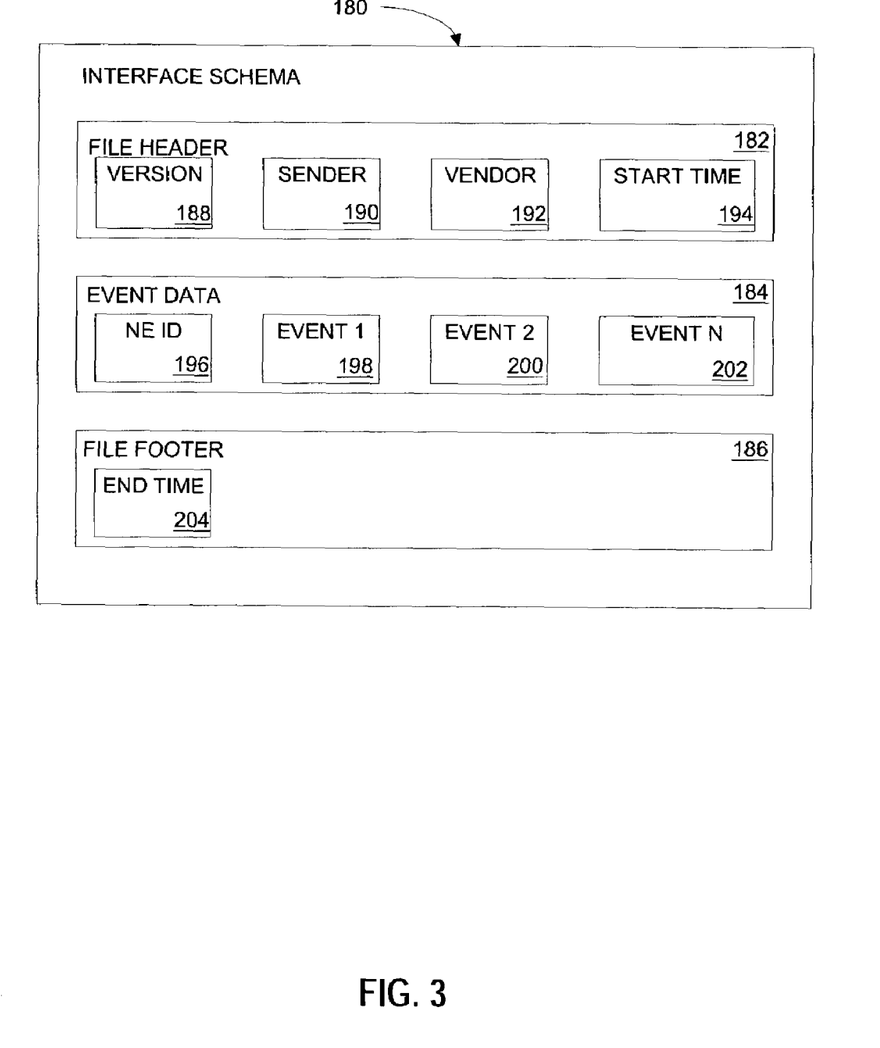
FIG. 3 is an illustration of a representative interface schema that may be used for communications between the serving mobile location center and the network management system of FIGS. 1 and 2.

The interface schema 180 for a file may include a file header 182, an event data record 184, and a file footer 186. The file header 182 may include a version record 188 that may include information indicative of the version or identify of the SMLC 104 and/or the NMS 102, a sender record 190 that may include information regarding the sender (e.g., SMLC 104) for the file, a vendor record 192 that may include information regarding the provider of the device or application sending the file, and a start time record 194 that may include information regarding when the alarm records are started to be collected. Thus, the file header 182 may provide general information but, in this example, does not provide any information specific to an alarm.

The event data record 184 may include a network element identifier record 196 that may include information regarding the network element experiencing a problem related to the alarm being reported using the interface schema 180, an identifier of the SMLC 104 or other device or application that generated the alarm, etc. In addition, the event data record 184 may include one or more event records 198, 200, 202 that may include more specific information regarding events underlying an alarm such as, for example, an alarm identifier, information regarding probable cause of the alarm, an identifier of the object (e.g., network element or component) initiating the alarm, alarm time, an alarm acknowledgement information, alarm comments, etc.

The file footer record 204 may include an end time record 204 that may include information regarding an end time of alarm record collection.

In some embodiments, XML files or communications transmitted between the SMLC 104 and the NMS 102 may use on or more XML tags as indicated below in Table 1. The file or communication may regard an alarm event caused by a network element in network experiencing a problem or otherwise resulting in an alarm.

TABLE 1

| Term | XML tag | Description |
|---|---|---|
| Alarm File Header | afh | This is the alarm result file header to be inserted in each file. It includes a version indicator, the name, type and vendor name of the sending network node, and a time stamp ("collectionBeginTime"). |
| Alarm Data | ad | The "alarm data" construct represents the sequence of zero or more alarm report items contained in the file. It can be empty in case no alarm data can be provided. The individual alarm data elements can appear in any order. Each element contains the name of the network element ("neid") and the list of measurement results pertaining to that network element ("measInfo"). |
| Alarm File Footer | aff | The alarm report file footer to be inserted in each file. It includes a time stamp, which refers to the end of the overall alarm collection interval that is covered by the collected results being stored in this file. |
| File Format Version | ffv | This parameter identifies the file format version applied by the sender (e.g., the SMLC 104) to the file. |
| Sender Name | sn | The sender name uniquely identifies the network element that assembled this alarm file (e.g., the SMLC 104), according to the definitions in 3GPP TS 32.106. It may be identical to the sender's nEDistinguishedName. The string may be empty (i.e. string size = 0) in case it is not configured in the sender. |
| Sender Type | st | This is a user configurable identifier of the type of network node or element (e.g., the SMLC 104) that generated or sent the file. The string may be empty (i.e. string size = 0) in case the "senderType" is not configured in the sender. |
| Vendor Name | vn | The vendor name identifies the vendor of the equipment that provided the file. The string may be empty (i.e. string size = 0) if the vendor name is not configured in or by the sender. |
| Collection begin time | cbt | The collection begin time for a file is a time stamp that refers to the start of the first collection interval that is covered by the collected alarm results that are stored in this file. |
| NE Identification | neid | The unique identification of the network element experiencing the problem that gave rise to an error notification sent to the SMLC 104. It may include an user name ("nEUserName") and an distinguished name ("nEDistinguishedName") associated with the network element. For multiple networks managed by the NMS 102, different network elements in the different networks may have the same neid. |
| NE User Name | neun | This is the user definable network element name, cf. 3GPP TS 32.106. The string may be empty (i.e. string size = 0) if the "nEUserName" is not configured. |
| NE Distinguished Name | nedn | This is the distinguishedName defined for the network element in 3GPP TS 32.106 for the network element experiencing a problem. It is unique across an operator's third generation network or across all networks managed by a the NMS 102. The string may be empty (i.e. string size = 0) if the "nEDistinguishedName" is not configured or used. |
| Alarm Information | ai | The sequence of alarms, values and related information. It may include a list of alarm types and the corresponding instantiation, together with a time stamp pertaining to these alarms. |
| Alarm Time Stamp | ats | Time stamp referring to an occurrence moment of alarm event report. |
| Alarm Type | at | Alarm type referring to a category of a alarm event underlying the alarm. Possible alarm categories include "communication", "process", "environmental", "software" and "security". |
| Probable Cause | pc | Probable cause referring the error code of an alarm event |
| MO Identifier | moid | The Managed Object Instance Id field identifies the component or node object class and its instance, e.g. trunk 1 means object class is trunk and instance #1 is being observed with alarms. |
| Severity | sv | Severity of the alarm event (e.g., major, minor, intermediate, warning) |
| Time Stamp | ts | GeneralizedTime format. The information within the timestamp may include year, month, day, hour, minute, and second. |

As one example of an XML compliant communication using the tags provided in Table 1, a notification or communication regarding an active alarm list may follow a form or format indicated as follows:

```
<!-- SMLCAlarmReportCollection.dtd version 0.1 -->
<!ELEMENT smlcarc (afh, ad*, aff)>
<!ELEMENT afh (ffv, sn, st, vn, cbt)>
<!ELEMENT ad (neid, ai*)>
<!ELEMENT aff (ts)>
<!ELEMENT ffv (#PCDATA)>
<!ELEMENT sn (#PCDATA)>
<!ELEMENT st (#PCDATA)>
<!ELEMENT vn (#PCDATA)>
<!ELEMENT cbt (#PCDATA)>
<!ELEMENT neid (neun, nedn)>
<!ELEMENT ai (ats,at, pc, moid, sv)>
<!ELEMENT ts (#PCDATA)>
<!ELEMENT nedn (#PCDATA)>
<!ELEMENT neun (#PCDATA)>
<!ELEMENT ats (#PCDATA)>
<!ELEMENT at (#PCDATA)>
<!ELEMENT pc (#PCDATA)>
<!ELEMENT moid (#PCDATA)>
<!ELEMENT sv (#PCDATA)>
<!-- end of SMLCAlarmReportCollection.dtd -->
```

An XML compliant document or data is ready for display or use by the NMS 102 with an DTD (Document Type Definition) file and a style file sheet. These files can be prepared by the SMLC 104 and sent to the NMS 102 during the first connection negotiation phase between the NMS 102 and the SMLC 104 before the SMLC 104 sends an SMCL state change event report to the NMS 102. When the SMLC 104 sends alarm data to the NMS 102, the NMS 102 can display the data. Use of the XML protocol also provides metadata DOM (Document Object Model) for a database interface API (Applications Program Interface) and the DOM supports a set of interfaces that allows alarm files to be loaded into a tree structure and then operated upon. In some embodiments, when a operator is observing a network element with its internal active alarm list, the operator also may be monitoring a network-wide active alarm list. Thus, the NMS 102 may pull active alarm lists relating to numerous network elements and merge them into one file which can be browsed or reviewed as a single network alarm monitoring list. The NMS 102 may implement a periodic alarm alignment function to resolve alarm inconsistencies between the NMS 102 and the network elements. The merging of alarms from different network elements may require a file merge function.

In some embodiments, an XML file representing an active alarm list may be refreshed when the NMS 102 or other device displays file is displayed to an operator. For example, the NMS 102 may request and updated active alarm list from the SMLC 104 so that the NMS 102 retains current information regarding the alarms reported on the active alarm list or other currently pending alarms. In some embodiments, the SMLC 104 may periodically update its alarms or active alarm list. The NMS 102 may cache data regarding alarms received from the SMLC 104 and use a management application to determine if any of the data has changed. The management application may send requests to the SMLC 104 for new or updated information regarding alarms and regenerate its own XML file accordingly.

SMLC and NMS

Figure 6:
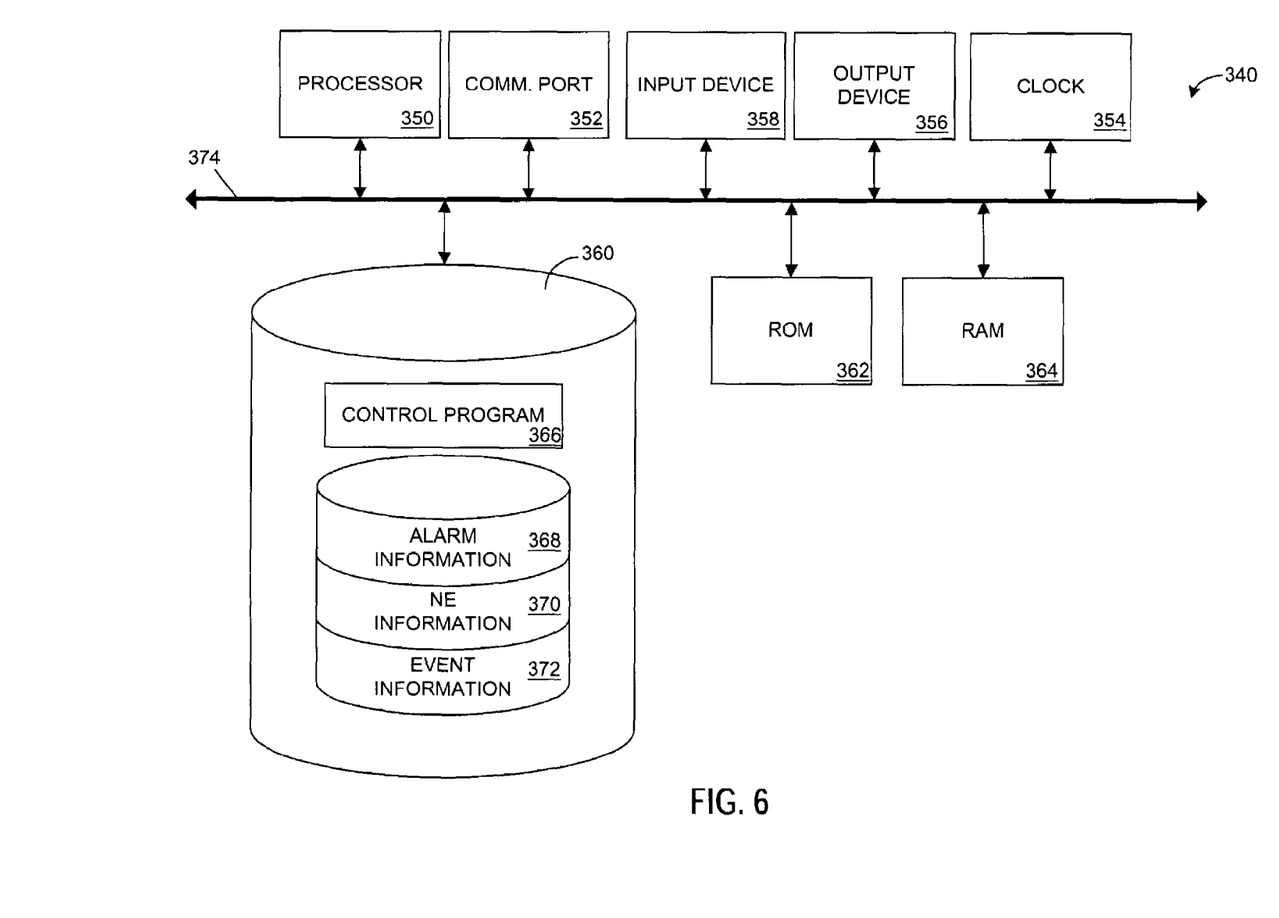
FIG. 6 is a block diagram of potential system components for the serving mobile location center and/or the network management system of FIGS. 1 and 2.

Now referring to FIG. 6, a representative block diagram of a device 340 is illustrated. In some embodiments, the SMLC 104 and/or the NMS 102 may include the device 340, operate on the device 340, be implemented by the device 340, etc. In other embodiments, the device 340 may be used to implement one or more of the methods described above.

The device 340 may include a processor, microchip, central processing unit, or computer 350 that is in communication with or otherwise uses or includes one or more communication ports 352 for communicating with user devices and/or other devices. Communication ports may include such things as local area network adapters, wireless communication devices, Bluetooth technology, etc. The device 340 also may include an internal clock element 354 to maintain an accurate time and date for the device 340, create time stamps for communications received or sent by the device 340, etc.

If desired, the device 340 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the device 340 may include a memory or data storage device 360 to store information, software, databases, communications, device drivers, alarm information, status or state information, etc. The memory or data storage device 360 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The device 340 also may include separate ROM 362 and RAM 364.

The processor 350 and the data storage device 360 in the device 340 each may be, for example: (i) located entirely within a single computer or other computing device; or (ii) connected to each other by a remote communication medium, such as a serial port cable, telephone line or radio frequency transceiver. In one embodiment, the device 340 may comprise one or more computers that are connected to a remote server computer for maintaining databases.

A conventional personal computer or workstation with sufficient memory and processing capability may be used as the device 340. In one embodiment, the device 340 operates as or includes a Web server for an Internet environment. The device 340 preferably is capable of high volume transaction processing, performing a significant number of mathematical calculations in processing communications and database searches. A Pentium™ microprocessor such as the Pentium III™ of IV™ microprocessor, manufactured by Intel Corporation may be used for the processor 350. Other processors are available from Motorola, Inc., AMD, or Sun Microsystems, Inc. The processor 350 also may comprise one or more microprocessors, computers, computer systems, etc.

Software may be resident and operating or operational on the device 340. The software may be stored on the data storage device 360 and may include a control program 366 for operating the server, databases, etc. The control program 366 may control the processor 350. The processor 350 preferably performs instructions of the control program 366, and thereby operates in accordance with the present invention, and particularly in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The device 340 also may include or store information regarding users, user devices, network elements, alarms, alarm resolution procedures, clearance information, location request information communications, etc. For example, information regarding one or more alarms may be stored in an alarm information database 368 for use by the device 340 or another device or entity. Information regarding one or more network elements may be stored in a network element information database 370 for use by the device 340 or another device or entity and information regarding one or more events may be stored in an event information database 372 for use by the device 340 or another device or entity. In some embodiments, some or all of one or more of the databases may be stored or mirrored remotely from the device 340.

According to an embodiment of the present invention, the instructions of the control program may be read into a main memory from another computer-readable medium, such as from the ROM 362 to the RAM 364. Execution of sequences of the instructions in the control program causes the processor 350 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 374

While specific implementations and hardware/software configurations for the device 340 have been illustrated, it should be noted that other implementations and hardware/software configurations are possible and that no specific implementation or hardware configuration is needed. Thus, not all of the components illustrated in FIG. 6 may be needed for a device 340 or other device implementing one or more of the methods disclosed herein.

The methods of the present invention may be embodied as a computer program developed using an object oriented language that allows the modeling of complex systems with modular objects to create abstractions that are representative of real world, physical objects and their interrelationships.

However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed:

1. A method for handling information regarding a state change event, comprising:
   determining a state change event corresponding to an alarm, wherein said state change event is distinct from said alarm;
   providing a notification regarding said state change event;
   receiving a request for an updated active alarm list after providing said notification; and
   providing said updated active alarm list after receiving said request.

2. The method of claim 1, wherein said determining a state change event corresponding to an alarm includes generating an alarm that causes said state change event.

3. The method of claim 1, wherein said determining a state change event corresponding to an alarm includes clearing an alarm that causes said state change event.

4. The method of claim 1, wherein said receiving a request for an updated active alarm list includes receiving a request for information regarding at least one uncleared alarm.

5. The method of claim 1, wherein said providing said updated active alarm list includes providing said active alarm list in an Extensible Mark-up Language (XML) compatible format.

6. The method of claim 1, wherein said providing said updated active alarm list includes providing said active alarm list to a network management system (NMS).

7. The method of claim 1, further comprising:
   initiating an alarm that causes said state change event.

8. The method of claim 1, wherein said state change event includes changing state from a first state to a second state and said second state is based on an alarm severity level associated with said second state.

9. The method of claim 1, further comprising:
   operating in one of a plurality of states.

10. The method of claim 9, wherein each of said plurality of states is associated with a different alarm severity level.

11. The method of claim 9, wherein said operating in one of said plurality of states includes operating in the one of said plurality of states associated with a currently uncleared alarm having a level of severity higher than levels of severity associated with other currently uncleared alarms.

12. The method of claim 1, wherein a serving mobile location center conducts said determining a state change event, said providing a notification regarding said first state change event said receiving a request for an updated active alarm list, and said providing said updated active alarm list after receiving said request.

13. The method of claim 12, wherein a network management system receives said notification from said serving mobile location center, sends said request to said serving mobile location center, and receives said updated active alarm list from said serving mobile location center.

14. A method for handling information regarding state change event, comprising:
   receiving a notification regarding a state change event, wherein said state change event is distinct from an alarm corresponding to said state chance event;
   providing a request for an updated active alarm list after receiving said notification; and
   receiving said updated active alarm list.

15. The method of claim 14, wherein said receiving a notification regarding a state change event includes receiving information regarding an occurrence of an alarm corresponding to said state change event.

16. The method of claim 14, wherein said receiving a notification regarding a state change event includes receiving information regarding a clearance of an alarm corresponding to said state change event.

17. The method of claim 14, wherein said receiving a notification regarding a state change event includes receiving said notification from a serving mobile location center (SMLC).

18. The method of claim 14, wherein said providing a request for an updated active alarm list includes providing said request to a serving mobile location center.

19. The method of claim 14, wherein said receiving said updated active alarm list includes receiving said active alarm list in an Extensible Mark-Up Language (XML) compatible format.

20. The method of claim 14, wherein said receiving said updated active alarm list includes receiving said active alarm list from an SMLC.

21. The method of claim 14, further comprising:
   displaying at least a portion of said active alarm list.

22. The method of claim 14, further comprising:
   determining when to provide said request to said first device for an updated active alarm list.

23. A system for handling information regarding a state change event, comprising:
- a memory;
- a communication port; and
- a processor connected to said memory and said communication port, said processor being operative to:
- determine a state change event corresponding to an alarm, wherein said state change event is distinct from said alarm;
- provide a notification regarding said state change event;
- receive a request for an updated active alarm list after providing said notification; and
- provide said updated active alarm list after receiving said request.

24. A computer program product in a computer readable medium for handling information regarding state change event, comprising:
- instructions for identifying a state change event corresponding to an alarm, wherein said state change is distinct from said alarm;
- instructions for sending a notification regarding first state change event;
- instructions for obtaining a request for an updated active alarm list after providing said notification; and
- instructions for sending said updated active alarm list after receiving said request.

25. A system for handling information regarding a state change event, comprising:
- a memory;
- a communication port; and
- a processor connected to said memory and said communication port, said processor being operative to:
- receive a notification regarding a state change event, wherein said state change event is distinct from an alarm corresponding to said state change event;
- provide a request for an updated active alarm list after receipt of said notification; and
- receive said updated active alarm list.

26. A computer program product in a computer readable medium for handling information regarding a state change event, comprising:
- instructions for obtaining a notification regarding a state change event, wherein said state change event is distinct from an alarm corresponding to said state change event;
- instructions for sending a request for an updated active alarm list after obtaining said notification; and
- instructions for obtaining said updated active alarm list.

* * * * *